UNITED STATES PATENT OFFICE.

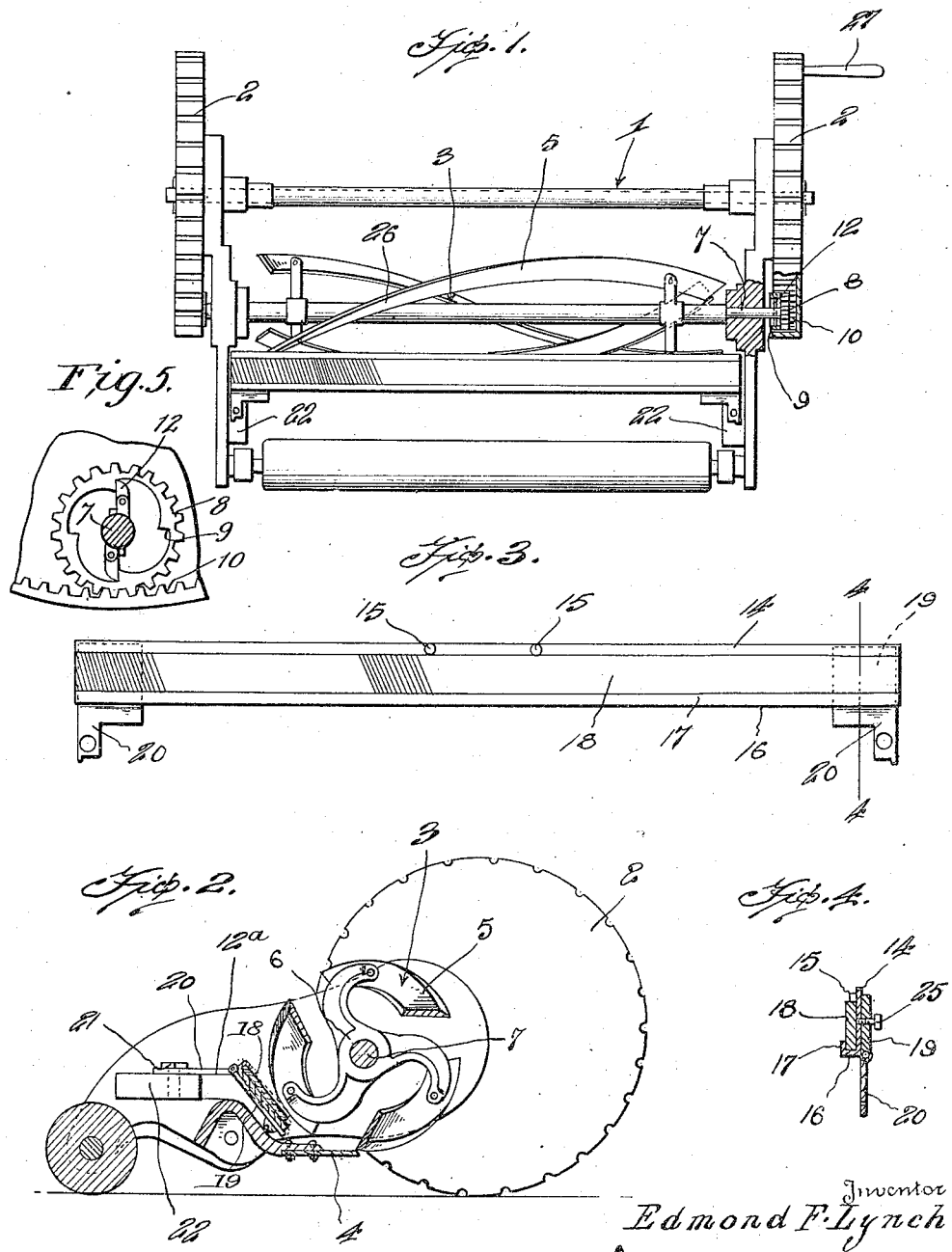

EDMOND F. LYNCH, OF CHARLESTOWN, NEW HAMPSHIRE.

LAWN-MOWER SHARPENER.

1,242,011.         Specification of Letters Patent.         Patented Oct. 2, 1917.

Application filed December 28, 1915. Serial No. 69,038.

*To all whom it may concern:*

Be it known that I, EDMOND F. LYNCH, a citizen of the United States, residing at Charlestown, in the county of Sullivan and State of New Hampshire, have invented certain new and useful Improvements in Lawn-Mower Sharpeners; and I do hereby declare the following to be a full, clear, and exact description of the invention, such as will enable others skilled in the art to which it appertains to make and use the same.

This invention relates to lawn mower sharpeners, and the primary object of the invention is to provide a sharpener which is comparatively simple in construction and which may be attached to any ordinary type of lawn mower for sharpening the blades of the lawn mower upon reverse rotation of the blades.

Another object of this invention is to provide a lawn mower sharpener which is constructed so that it may be attached to the lawn mower at all times, and will during the operation of the lawn mower for cutting grass, or the like drop into an inoperative position and when the lawn mower is turned upside down, it will fall into engagement with the edges of one of the blades of the mower for sharpening the blades upon the reverse rotation thereof.

With the foregoing and other objects in view this invention consists in such novel features of construction, combination and arrangement of parts as will be hereinafter more fully described illustrated in the accompanying drawings and claimed.

In describing the invention in detail reference will be had to the accompanying drawings wherein like characters designate like and corresponding parts throughout the several views, and in which:—

Figure 1 is a bottom plan view of a lawn mower showing the improved sharpener attached thereto.

Fig. 2 is a cross sectional view through the lawn mower showing the sharpener attached.

Fig. 3 is an elevation of the sharpener.

Fig. 4 is a cross section of the sharpener on the line 4—4 of Fig. 3, and

Fig. 5 is an enlarged detail view of the ratchet and pawl mechanism.

Referring more particularly to the drawings, 1 designates a lawn mower structure as an entirety, which includes a pair of rotatable ground or supporting wheels 2, a rotary cutting mechanism 3, and a stationary blade 4. The rotary cutting mechanism 3, includes a plurality of blades 5, and sleeves 6, which rotate about a shaft 7. The shaft 7 has gears 8 mounted upon its ends, which gears have internal ratchets 9 formed integral therewith. The gears 8 mesh with the internal teeth 10 of the ground or supporting wheels 2, for propelling the cutting mechanism 3. The gears 8 and the internal ratchets 9 are loosely mounted upon the shaft 7, and the shaft is rotated in a forward direction, for cutting grass by pins 12 or any other suitable structure ordinarily in use, which engages with the ratchet teeth formed on the interior of the gears 9.

The sharpener attachment, generically indicated by the numeral 12$^a$ comprises a substantially L-shaped bar 14, which has spaced lugs 15 attached thereto and extending inwardly from its inner face, adjacent the top of the vertical sides thereof. The base 16 of the plate 14 has its outer edge upturned as shown at 17 for receiving a file or sharpening element 18, the upper edge of which abuts the lugs 15. The L-shaped plate 14 is connected to plates 19, at its ends, which plates 19 are in turn hingedly connected to plates 20. The plates 20 are attached in any suitable manner such as by bolts indicated at 21 to the ends of the frame or supporting structure 22 of the lawn mower. Set screws 25 extend through the plates 19 and the back of the L-shaped plate 14 for adjusting the position of the file or sharpening element 18, for causing the same to engage the sharpened edges of the blades 5 of the cutting mechanism 3. When it is desired to sharpen the blades 5 of the lawn mower by the improved sharpener, the ground or supporting wheels 2 are removed, and the gear 8 is taken from one end of the shaft 7 and changed with the gear upon the other end which will cause the shaft and consequently the cutting mechanism 3 to rotate in a reverse direction to that in which it rotates when cutting grass, causing the sharpened edges 26 of the blades 5 to travel over the surface of the file or sharpening element 8. The lawn mower is positioned upside down, after the gears have been changed, and the ground wheels 2 are replaced upon the end of the shaft upon which they rotate, and a handle indicated at 27 is attached to one of the wheels 2 for rotating the same.

The weight of the L-shaped plate 14 and the file or sharpening element 18 will cause the same to fall downwardly so that file will properly engage the cutting edges of the blades 5 for sharpening them during the rotation of the cutting mechanism by the rotation of the wheel 2.

In reducing the invention to practice, certain minor features of construction, combination and arrangement of parts may necessitate alterations to which the patentee is entitled, provided such alterations are comprehended within the scope of what is claimed.

What is claimed is:—

1. The combination with an ordinary lawn mower including a supporting frame, and a rotary cutting structure, said rotary cutting structure including a plurality of blades having their edges sharpened, of a substantially L-shaped plate hingedly connected to said supporting structure, whereby said substantially L-shaped plate is free to swing thereon in one direction, said L-shaped plate being positioned for normally lying out of engagement with the edges of said blade by gravity when the lawn mower is in an operative position and adapted for moving into engagement with the edges of said blades by gravity when the lawn mower is turned up side down for sharpening the blades upon reverse rotation of the cutting structure and a sharpening element detachably carried by said L-shaped plate.

2. The combination with an ordinary lawn mower including a supporting frame, a rotary cutting structure, said rotary cutting structure including a plurality of blades having the edges sharpened, of a substantially L-shaped plate hingedly connected to said supporting structure to swing thereon and positioned for normally lying out of engagement with the edges of said blade by gravity when the lawn mower is in an operative position, and adapted for movement into engagement with the edges of said blades by gravity when the lawn mower is turned up side down for sharpening the blades upon reverse rotation of the cutting structure, and a sharpening element detachably carried by said L-shaped plate, set screws carried by said L-shaped plate for engagement with the rear face of said sharpening element for adjusting its position with relation to the L-shaped plate.

In testimony whereof I affix my signature in presence of two witnesses.

EDMOND F. LYNCH.

Witnesses:
RICHARD R. FINN,
DAVID V. COHOLANE.